United States Patent [19]

Beck et al.

[11] 4,012,477
[45] Mar. 15, 1977

[54] METHOD FOR PRODUCING PLASTIC SHEET OR FILM STOCK

[75] Inventors: Erich Beck, Worms, Germany; Albert C. Robbins, Alvin; John C. Birdsall, Houston, both of Tex.

[73] Assignee: Askco Engineering Corporation, Pasadena, Tex.

[22] Filed: Apr. 11, 1975

[21] Appl. No.: 567,256

Related U.S. Application Data

[62] Division of Ser. No. 307,058, Nov. 16, 1972, Pat. No. 3,880,564.

[52] U.S. Cl. .......................................... 264/176 R
[51] Int. Cl.² ...................... B29D 7/02; B29F 3/00
[58] Field of Search .......... 264/75, 76, 175, 176 R, 264/177 R, 126, 349, 177; 425/374, 205, 223, 224, 380, 375, 376

[56] References Cited

UNITED STATES PATENTS

| | | | |
|---|---|---|---|
| 2,586,607 | 2/1952 | Brown | 264/349 |
| 3,007,207 | 11/1961 | Salhofer | 264/175 |
| 3,317,952 | 5/1967 | Rodenacker | 425/223 |
| 3,705,778 | 12/1972 | Collin | 425/224 |
| 3,778,036 | 12/1973 | Collin | 425/209 |

FOREIGN PATENTS OR APPLICATIONS 1,479,894 6/1969 Germany

*Primary Examiner* — Willard E. Hoag
*Attorney, Agent, or Firm* — Bard, Springs, & Jackson

[57] ABSTRACT

Method of extruding a plastic film using a single roll which is rotatably and horizontally mounted between spaced-apart supporting members, each having curved recesses partially accommodating and encompassing opposite portions of the circumference of the roller. Molten plastic is distributed along the length of the roller, and the roller is preferably revolved to carry the molten plastic through the first recess to the second recess, whereby a substantially equal accumulation of plastic is collected in each recess and at opposite locations on the surface of the roller. The second accumulation of plastic is further located at a die aperture in the adjacent one of the two supporting members, whereby plastic from the second accumulation is extruded through the die aperture to form the sheet stock sought to be produced. The first accumulation of plastic which is squeezed between the other support member and the roller provides a force on the roller which equals and offsets the force being applied to the roller by the second accumulation of plastic, whereby the roller is protected against bending or other lateral deformation.

14 Claims, 9 Drawing Figures

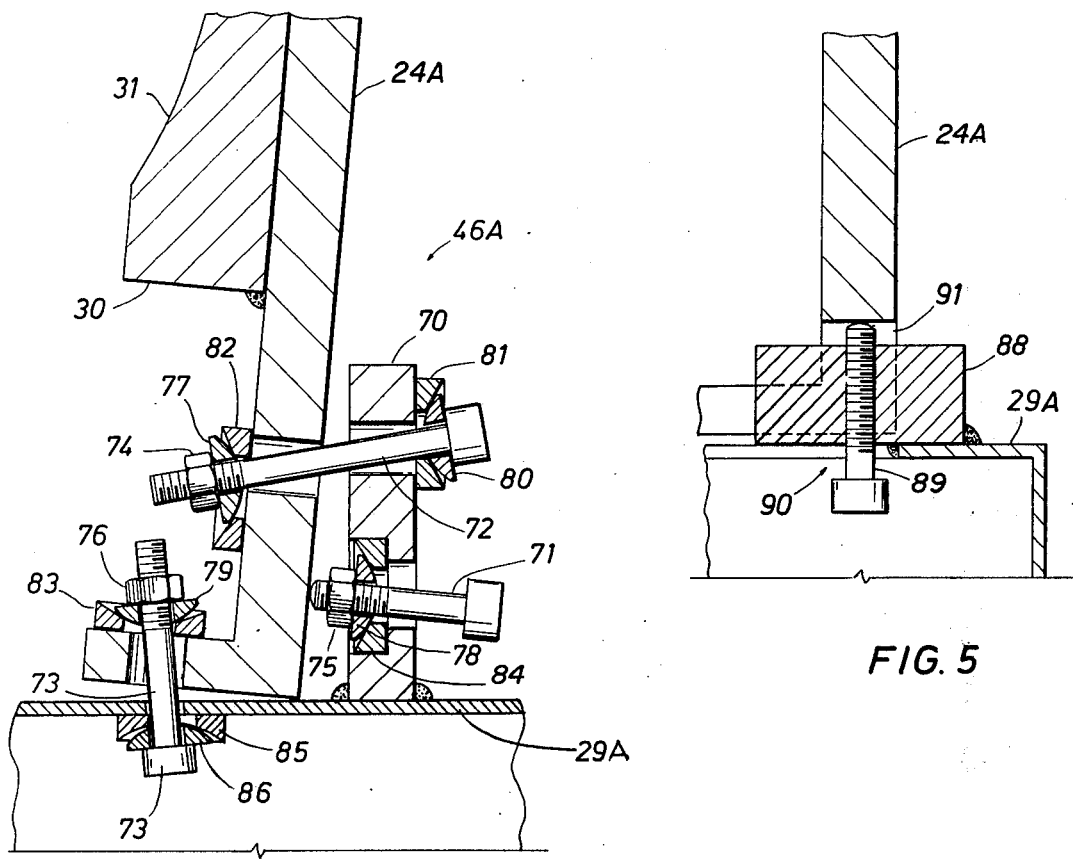
FIG. 4
FIG. 5
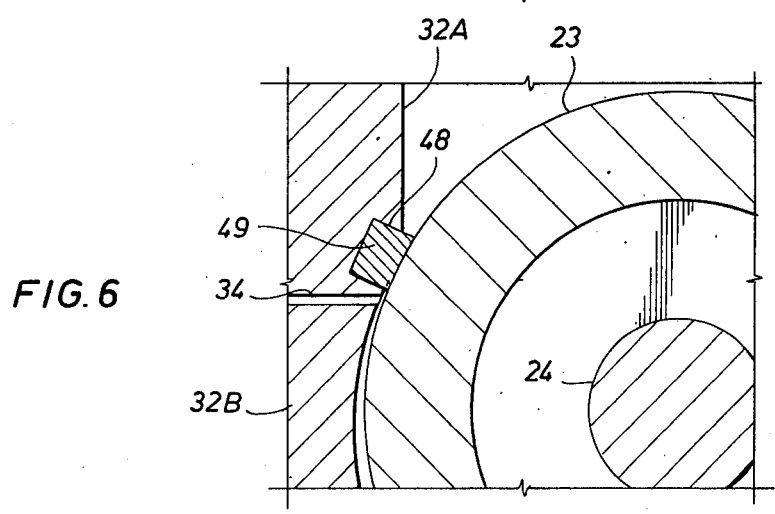
FIG. 6

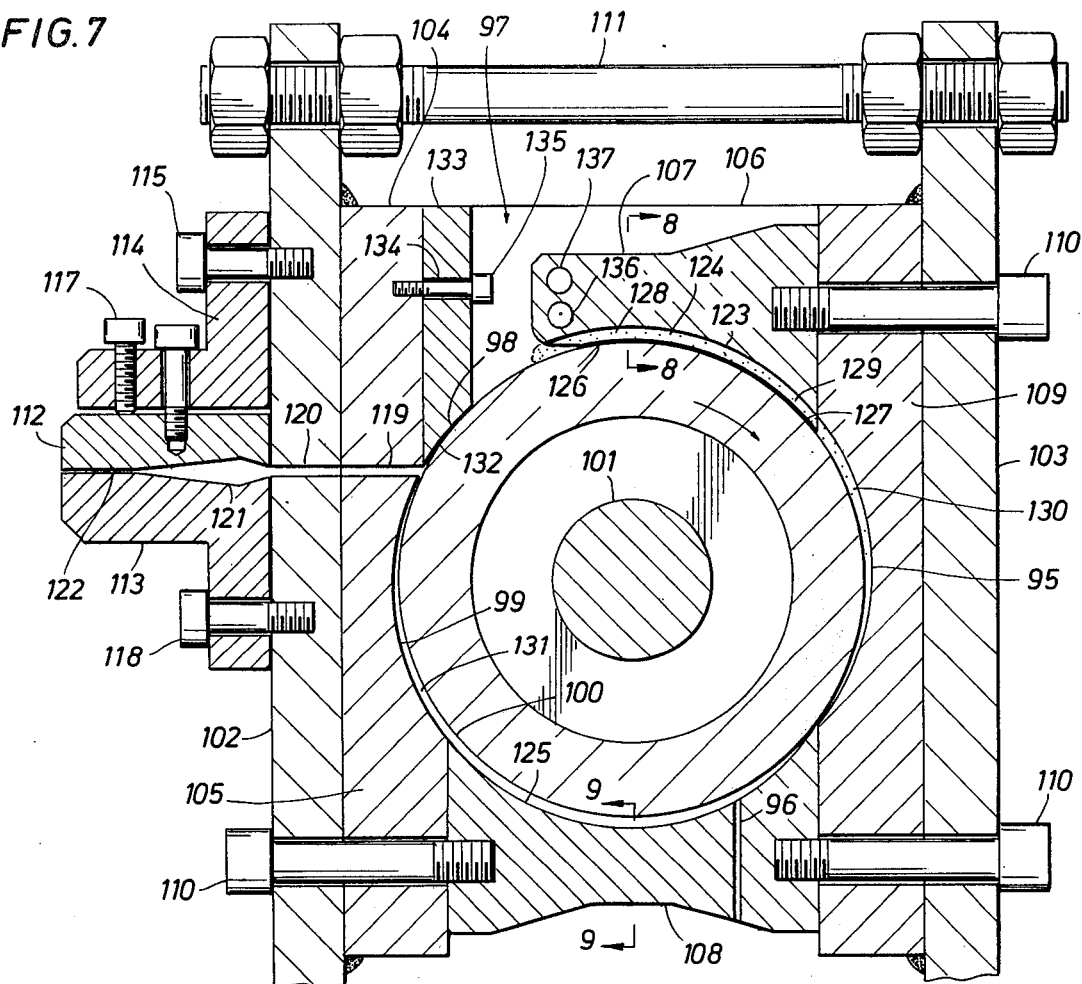
FIG. 7
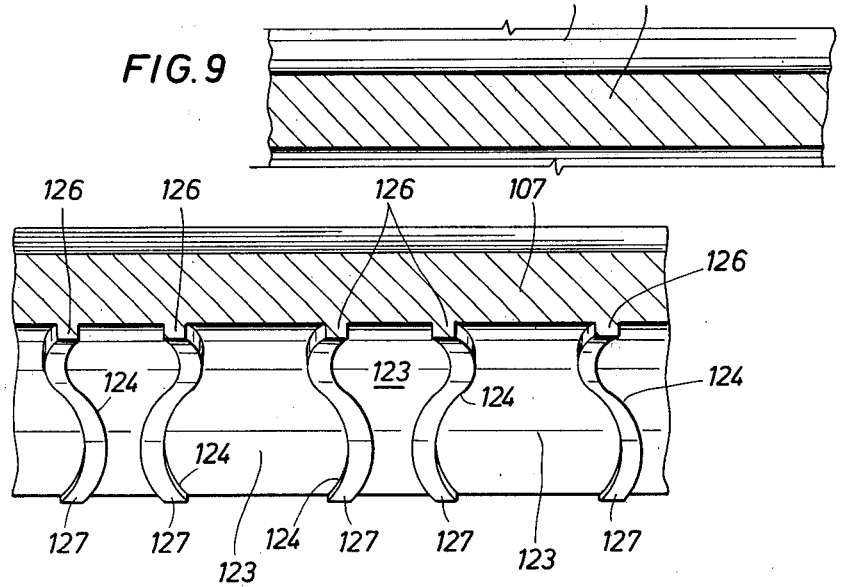
FIG. 9
FIG. 8

METHOD FOR PRODUCING PLASTIC SHEET OR FILM STOCK

BACKGROUND OF INVENTION

This is a division of Ser. No. 307,058, filed Nov. 16, 1972, now U.S. Pat. No. 3,880,564.

This invention relates to methods and apparatus for producing sheet material and the like, and, more particularly, relates to improved die extrusion methods and apparatus for producing thermoplastic sheet or film stock.

It is well known in the prior art that pellets or other solid particles of a thermoplastic material such as polyethylene or the like can be reduced to molten form and can thereafter be reformed and solidified to make sheet or film stock. In this respect, the term "film" is generally used with reference to sheet material having a thickness not greater than 3 mils, and the term "sheet" is generally applied to flat stock which may be either flexible or relatively stiff in character.

In a broad sense, a system for producing thermoplastic film or sheet stock will usually include a component or section for storing and delivering pellets of solid plastic to the system, and expressor section which receives and transforms the pellets into a molten or semi-molten flow of plastic, and a forming section which receives and transforms the flow into finished sheet or film. In addition, suitable take-up equipment is usually included for receiving the finished stock from the forming section of the system and for reeling, cutting, stacking, and otherwise handling and preparing the finished stock for either storage or delivery to the user.

The storing and feed section can be any of several conventional types and may include provision whereby coloring, anti-oxidants and other additives may be combined with the plastic pellets in desired proportions. For example, a particularly useful apparatus for this purpose may be a hopper and feed assembly such as that described in U.S. Pat. No. 3,659,748.

Many types and designs of equipment have been built and used for the purpose of transforming the solid pellets received from feed section into a molten or otherwise flowable and homogeneous state, whereby it can be reformed into film or sheet stock. However, an especially suitable type of equipment for this purpose is an expressor of the type depicted and referred to in the aforesaid U.S. Pat. No. 3,659,748 as an extruder. More particularly, an expressor of this type will generally include a hollow barrel or tube having a screw-like member revolvably disposed therein. Pellets and other solid particulate matter are fed into one end of the barrel and are then carried spirally along the barrel by rotation of the screw member in the barrel. However, the threads of the screw, or "flights," are preferably formed so as to provide a tapering and decreasing clearance between the screw member and the inside wall of the barrel, whereby the pellets are subjected to an increasing pressure as they are carried through the barrel. In particular, therefore, the pellets are thus reduced to molten or semi-molten form before being expelled in this state out of a suitable aperture in the opposite end of the barrel. It should also be noted, in this regard, that rotation of the screw member also functions to intermingle the pellets and additives so that the molten plastic is a homogenous mixture.

As hereinbefore stated, the purpose of the forming section of the system is to receive the flowing mixture discharging from the expressor section, and to reform and otherwise process it into finished film or sheet stock of solid consistency and having the desired width and thickness. Generally stated, however, the forming section may be either of two types of apparatus, i.e., it may be either calendering apparatus, or it may be extrusion equipment, depending largely if not entirely on the type of plastic sought to be processed in this manner.

A calender is an assembly of one or more pairs of rollers which are arranged in the manner of wringers. Thus, molten plastic from the expressor is fed to and squeezed between the rollers in order to impart the sheet-like configuration sought to be achieved. Extrusion apparatus, on the other hand, includes means for conducting the molten plastic through an extrusion die having the desired shape. An extrusion apparatus will often include rollers and the like for conveying the extruded sheet material through cooling apparatus, and also for polishing or otherwise imparting a desired texture to the surface of the film or sheet stock. However, the term "calender" is applied to any roller-type apparatus wherein the sheet material is given the thickness desired by squeezing or pressing between two or more closely aligned rollers, rather than by extrusion through a die aperture of the like.

As hereinbefore stated, plastic sheet or film stock is regularly produced which is relatively stiff and which is suitable for being reformed into objects such as ash trays, ice trays, etc. On the other hand, film or sheet stock can be produced which is quite bendable, even limp, and also has many well-known uses. Whether the finished stock is stiff or flexible depends upon the type of plastic which is used and does not depend on whether it is made with calendering or extrusion equipment. On the other hand, stiff sheet stock can usually be produced only with extrusion apparatus, whereas flexible sheet stock is made in most if not all cases with calendering equipment.

The reason for this is that most flexible sheet stock is made from a thermoplastic material such as a suitable polyvinylchloride, whereas rigid stock is usually made of a material such as polyethylene or polypropylene or the like, and which tends to experience oxidation at forming temperatures. Thus, it is necessary to protect the molten plastic from exposure to oxygen in the ambient atmosphere, at least until after it departs from the die aperture, as well as to include appropriate anti-oxidants in the mixture.

Flexible plastic stock may also tend to experience oxidation when exposed to the ambient atmosphere at melting temperatures. Flexible plastics of the type hereinbefore mentioned tend to have much lower forming temperatures, however, whereupon the tendency to degrade for this reason is substantially less than in the case of rigid plastics, and especially if the forming operation is conducted with dispatch. Accordingly, in most calendering equipment, the rollers, and thus the material passing between them, are exposed to the ambient atmosphere.

Notwithstanding that equipment of the foregoing description is widely used, these and other types of sheet-making systems of the prior art are all subject to many serious disadvantages. In the case of extrusion equipment, it should be noted that such equipment usually consists of a conventional screw-type expressor having a simple sheet die fitted to is outlet port. This outlet port of the expressor is conventionally round and relatively small in diameter, whereby the molten plastic is discharged uniformly and as a homogenous mixture, and whereby the intake port of the sheet die is correspondingly round and small so that it can mate directly with the expressor.

The sheet die is a hollow member having a broad slot-like die aperture as its outlet port. Since the outlet port or die aperture is located opposite the intake port, the molten plastic entering the intake port must spread apart as it fills and traverses the die aperture. A thermoplastic resin of this type is well known to have a "memory" characteristic, and since the plastic issuing from the outer end of the die aperture will travel farther and in a different direction as compared to the plastic issuing from the center portion of the die aperture, it will be obvious that the side portions of the finished sheet stock will have a different "memory" than that of the center portion. In addition, the plastic which travels to the outer edges of the die aperture will be at a different temperature, and thus may undergo a different chemical change, whereby the edges of the sheet stock may actually be composed of a different plastic. Any one or more of these phenomena will tend to create internal stresses in the finished sheet stock which, if sufficiently severe, may render the sheet stock completely worthless from a commercial standpoint.

It will be apparent that the magnitude of these stresses is directly related to the width of the die aperture. Thus, most extrusion equipment can produce only relatively; narrow sheet stock, which is a serious limitation since there is a substantial market for stiff or rigid sheet stock of greater widths.

It will also be apparent, on the other hand, that in a calender all of the molten plastic travels the same distance and in the same direction as it is squeezed between the rollers. Thus, sheet stock which is produced by a calender is not subject to developing internal stresses as is the case with conventional extrusion equipment. On the other hand, it will also be apparent that the plastic tends to squeeze the rollers apart as it passes between them. This tends to bow or deform the rollers and this, in turn, tends to cause the finished sheet stock to be thicker in the middle than at the edges. In calendering equipment of conventional design, this disadvantage is sought to be overcome by providing rollers which are substantially nondeformable by virtue of having large diameters relative to their length. Thus, it is conventional in such equipment to provide rollers which are no longer than about 2.8 times their diameter.

This limitation on length relative to diameter successfully avoids deformation of the rollers in a calender. It should be remembered, however, that the rollers in a calender are usually made of heavy steel or the like, and that most calenders have several such pairs of rollers for imparting the proper thickness to the plastic sheet stock. Thus, the conventional calender is an extremely large, massive and heavy machine and is correspondingly quite expensive.

A radically different type of forming or extruding apparatus has recently been proposed which overcomes many of the disadvantages of the more conventional systems and which is described in a West German patent application filed by Erick Beck and published June 26, 1969, as Offenlegungsschrift No. 1,479,894. As may be seen therein, a single roller is rotatably and horizontally mounted between a spaced-apart pair of vertical plates. One of the plates is provided with a horizontal slot at approximately the point of tangency with the roller, and when molten plastic is poured onto the roller from expressors mounted above, the roller is revolved counter-clockwise to carry the plastic about its circumference. Some of the plastic will collect in a blob between the roller and the die plate at between 9 and 10 o'clock on the roller, and will be extruded out of the port to form the sheet. However, some of the plastic will be carried past the die port at 9 o'clock to collect in the space between the opposite plate and 3–4 o'clock on the roller.

In a system of this type, the sheet material will have a uniform thickness across its length because the shape of the material is determined by the configuration of the die and not by the roller. On the other hand, the material is fed uniformly into the die along the length of the roller, and thus the resulting sheet stock is produced with a minimum of internal stresses. Uniformity of feed is achieved by the fact that the roller is not subject to deformation due to resistance of the plastic being squeezed between the roller and the plate having the die aperture, and this is due, in turn, to the fact that an equal and offsetting amount of plastic is collected to squeeze between the opposite plate and the point on the roller opposite the other squeeze point. In other words, the two accumulations or "blobs" of plastic exert equal but opposite pressures at opposite locations on the roller, and thus the roller will revolve with little or no deformation along its length.

It will readily be apparent that apparatus of the type described in the aforementioned Offenlegungsschrift is based on a valid concept. However, apparatus of this type is also incapable of producing at a rate which is economically acceptable for most purposes, and this limitation has rendered this equipment commercially unsuitable except for very special applications.

These disadvantages of the prior art are overcome with the present invention, however, and novel methods and apparatus are herewith provided for producing high quality sheet stock of substantially increased widths. More important, however, such methods and apparatus are capable of a production rate at least as great as any of the systems embodying the concepts of the prior art and employ apparatus which is much lighter in weight and size and which is therefore much less expensive.

SUMMARY OF INVENTION

As will hereinafter be apparent, the present invention contemplates apparatus which employs the basic concept of the teachings set out in the aforementioned Offenlegungsschrift in that a single roller is horizontally disposed between a spaced-apart pair of plates wherein one is provided with a die aperture and the other is a back or back-up plate. In the present invention, however, the roller is revolved oppositely of the direction taught in the Offenlegungsschrift and relative to the location of the die aperture. More particularly, the direction of revolvement of the roller is opposite to that taught in the Offenlegungsschrift, whereby the surface of the roller is first carried to and past the back-up plate, and thence to and past the die plate, to complete the revolution. Accordingly, in this arrangement molten or liquid or semi-liquid plastic (depending on the type of material being handled) which is deposited on the roller at about the 12 o'clock location will be carried about the surface of the roller to accumulate between the roller and the die plate at about the 8 to 9 o'clock location. If the die aperture is located at the 9 o'clock location on the roller, as illustrated in the aforementioned Offenlegungsschrift, plastic from this accumulation then will be extruded through the die aperture to form the resulting sheet stock sought to be produced. Since a corresponding accumulation or blob of molten plastic will also collect in the tapering space between the back-up plate and about 2–3 o'clock on the roller, the offsetting pressures cancel each other and the roller will, as taught by the Offenlegungsschrift, not be deformed by the plastic as is experienced by the rollers of a calender. Thus, the diameter of the roller is not a limitation on its length for this reason.

The foregoing arrangement, wherein the roller is revolved in a direction opposite to that taught by the Offenlegungsschrift, obtains all of the advantages of the original concept and, at the same time, achieves certain other advantages such as greater dispersion and homogenizing of the molten plastic sought to be extruded. Nevertheless, such an arrangement still tends to be subject to the same disadvantage of limited production rate as compared to the production systems of the prior art.

It will be apparent that what carries the molten plastic about the roller to the die aperture is adhesion of plastic to the surface of the roller. It is also apparent that the reason plastic accumulates at the 2–3 and 8–9 o'clock locations is that the plastic is carried into a tapering space. In addition, the reason why plastic is extruded out the die aperture is that it is easier for the plastic at 8–9 o'clock to exit through the die aperture than to travel between the roller and the die plate past the 9 o'clock location. Due to the size of the angle between the die plate and the roller, however, it is only the very small amount of plastic which is immediately adjacent the 8:50–9:00 location which is actually under any appreciable force, and this is believed to be the factor which tends to limit the rate of production with this arrangement.

Accordingly, in a better form of the present invention this limitation is significantly reduced by disposing the roller between a pair of blocks having circular recesses, rather than between the flat surfaces of a back-up plate and a die plate. More particularly, the back-up plate is provided with a force balancing block which is preferably positioned so that the roller is within its recess but slightly eccentrically located relative to the curvature of the recess. Thus, the radius of curvature of the recess in the balancing block is preferably slightly greater than the radius of the roller, and the roller is further positioned so that the gap between the roller and the balancing block tapers restrictively in a clockwise direction about the roller.

A metering block of similar configuration and having a similar curved recess is provided in a reverse position between the die plate and the opposite side of the roller. In a particularly suitable embodiment, the metering block is preferably an assembly of two members, wherein the upper and lower pieces or members can be shifted either together or apart to narrow or widen the entry portion of the die aperture. In either case, the space between the metering block members should align with the die aperture in the die plate.

In such an arrangement, the roller is preferably positioned in the curved face or recess provided by the metering blocks exactly oppositely of its position in the curvature in the balancing block. As will hereinafter be explained, however, in this arrangement the exit port or ports of the die recess are preferably relocated to the point at the surface of the roller where the roller leaves the curved recess provided by the metering blocks, and exactly opposite the point on the other side of the roller where the roller leaves the curved recess in the balancing block. Hence, this greatly lengthens and narrows the accumulation gaps whereby balancing blobs or acccumulations of plastic will still be collected to maintain the proper configuration of the roller, but whereby the rate of productivity is greatly enhanced to the point where it equals or exceeds the production rates which can be obtained with the prior art.

It will be noted that the tapering configuration of the accumulation gaps hereinbefore described tend to exert a heavy pressure on the molten plastic being expelled onto the roller by the screw-type expressor, and in substantially the same way that the expressor functions to exert a melting or liquefying pressure on the pellets of solid plastic being received from the hopper assembly. In an ideal embodiment of the present invention, therefore, means is provided for lengthening the first accumulation gap to an extent such that the plastic pellets can be deposited directly on the roller and thereafter effectively liquefied or expressed as they are conducted through the first or force balancing gap and about the roller to the second or metering gap which terminates at the die port.

More particularly, in such an arrangement there is preferably provided a third block having a curved face which is mounted over the roller and against the force balancing block so that the third block combines with the force balancing block to enclose the roller from about 11–4 o'clock on the roller. Thus, the first accumulation gap is now extended about the roller between these two points.

It will be noted by those having experience in this art that the conventional screw-type roller travels the plastic through three separate stages along the interior of its barrel. In other words, during the first stage the pellets retain substantially their solid condition and are merely traveled or fed along the interior of the expressor barrel by the revolving screw. During the second stage, however, the space within the barrel is reduced so that the revolving screw subjects the pellets to liquefying pressure, and during the final or metering stage the liquid plastic is metered between the transitional stage to the outlet port of the expressor barrel.

In one form of expressor, the clearance between the body of the screw and the inside surface of the barrel is tapered gradually along the length of the barrel, and thus there will be no clearly defined limits between the three stages hereinbefore described. In another type of expressor, however, the clearance between the screw body and the barrel is uniform along the feed portion and also uniform but narrower along the metering portion of the expressor. Thus, the clearance along the transitional portion tapers abruptly between the feed and metering portions.

These differences in clearance are often desirable to accommodate different types of plastics which have different melting characteristics, and thus such differences must also be provided for in the practice of the present invention. Accordingly, the inside curved faces of both the third block and the force balancing block are preferably shaped to provide an initial clearance which is not only capable of accumulating plastic to balance the plastic collected in the metering gap on the opposite side of the roller, but also capable of achieving proper expressment of the plastic pellets into liquid or extrudable form. More particularly, the clearance between the roller and the third block is preferably such as to provide the equivalent of the feed, transitional, and at least the initial portion of the metering clearance which is established in the conventional screw-type expressor, and whereby the clearance between the roller and the force balancing block is not only sufficient to accumulate a balancing amount of plastic but will also, if necessary, provide a continuation of the metering clearance which begins between the roller and the third or upper block.

As indicated, at least a portion of the upper surface of the roller must be exposed so as to receive an input of plastic pellets. However, it is also desirable to enclose as much of the surface of the roller as possible. In the ideal embodiment of the present invention, the third block encloses the upper surface of the roller from about 11:00 or 11:30 to 2:30; the force balancing block then continues such enclosure to about 4:30 on the roller. A fourth block mounted under the roller and between the force balancing block and the lower member of the metering block assembly will enclose the roller from 4:30 to about 7:30, and the lower metering block member will enclose the roller from 7:30 to about 10:00 where the extrusion port begins. In addition, a back-pressure block is also preferably mounted slidably on the upper metering block member to continue the range of enclosure from the point adjacent the die port at 10:00 to a point about 10:30 to 11:00 on the roller, for reasons hereinafter explained in detail. The exact locations of these points will, however, depend on the type and character of the plastic being handled.

It is well known that some plastics tend to de-gas when heated, and thus the bottom or fourth block may conveniently have a vent or exhaust port to prevent gas bubbles from traveling about the roller and out through the extrusion port. In addition, it is also well known that plastic of commercial quality is inavoidably produced with slightly different characteristics. The revolving screw tends to commingle the material in the conventional expressor, whereby the molten plastic is expressed as a substantially homogeneous mixture. Accordingly, the curved surface of the aforementioned third or upper block is preferably provided with ribs or other irregularities for achieving dispersion and commingement of the plastic as it travels through the three stages.

In addition to the other prior art hereinbefore discussed, there is disclosed in the specification of British patent No. 759,354, dated July 28, 1972, a plastic extrusion apparatus having a single roller mounted rotatably in a cylindrical housing having a sidewall die aperture, the apparatus being apparently intended to overcome the problems dealt with by the present invention. In the British apparatus, however, there is the same size gap between the housing and substantially all points about the circumference of the roller, and this prevents formation of the balancing accumulations or blobs of molten plastic which, as hereinbefore described, prevent longitudinal deformation of the roller of the present invention. Furthermore, the roller of the present invention is preferably mounted in a swimming (floating) manner within the housing, whereas the British roller is fixedly mounted and thereby subject to longitudinal deformation for this reason alone.

Accordingly, it is a feature of the present invention to provide novel extrusion means and method for producing rigid thermoplastic sheet stock having stable internal stress characteristics and having substantially greater widths than have heretofore been possible with extrusion equipment of conventional design.

It is also a feature of the present invention to provide novel extrusion apparatus and methods which may be used to produce either rigid or flexible thermoplastic sheet stock.

It is further a feature of the present invention to provide novel apparatus of much less size and weight for producing flexible thermoplastic sheet or film stock having a uniform thickness across its width.

It is also a feature of the present invention to provide novel methods and apparatus for supplying molten or semi-molten thermoplastic material to an extrusion die or the like.

It is further a feature of the present invention to provide novel expressing methods and apparatus for transforming solid particulate thermoplastic material into a homogenous molten or semi-molten flow of thermoplastic material.

It is also a feature of the present invention to provide novel methods and apparatus for both expressing and extruding thermoplastic material as sheet or film stock.

These and other features and advantages of the present invention will become apparent from the following detailed description, wherein reference is made to the figures in the accompanying drawings.

IN THE DRAWINGS

FIG. 4 is a detailed pictorial representation of an alternative form of a portion of the apparatus illustrated in FIGS. 1–3.

FIG. 5 is a detailed pictorial representation of another different portion of the apparatus illustrated in FIGS. 1–3.

FIG. 6 is a detailed pictorial representation of another further different portion of the apparatus illustrated in FIGS. 1–3.

FIG. 7 is a detailed pictorial representation of another embodiment of the apparatus illustrated in FIG. 1.

FIG. 8 is a detailed pictorial representation of a portion of the apparatus depicted in FIG. 7.

FIG. 9 is a detailed pictorial representation of another portion of the apparatus depicted in FIG. 7.

DETAILED DESCRIPTION

Figure 1:
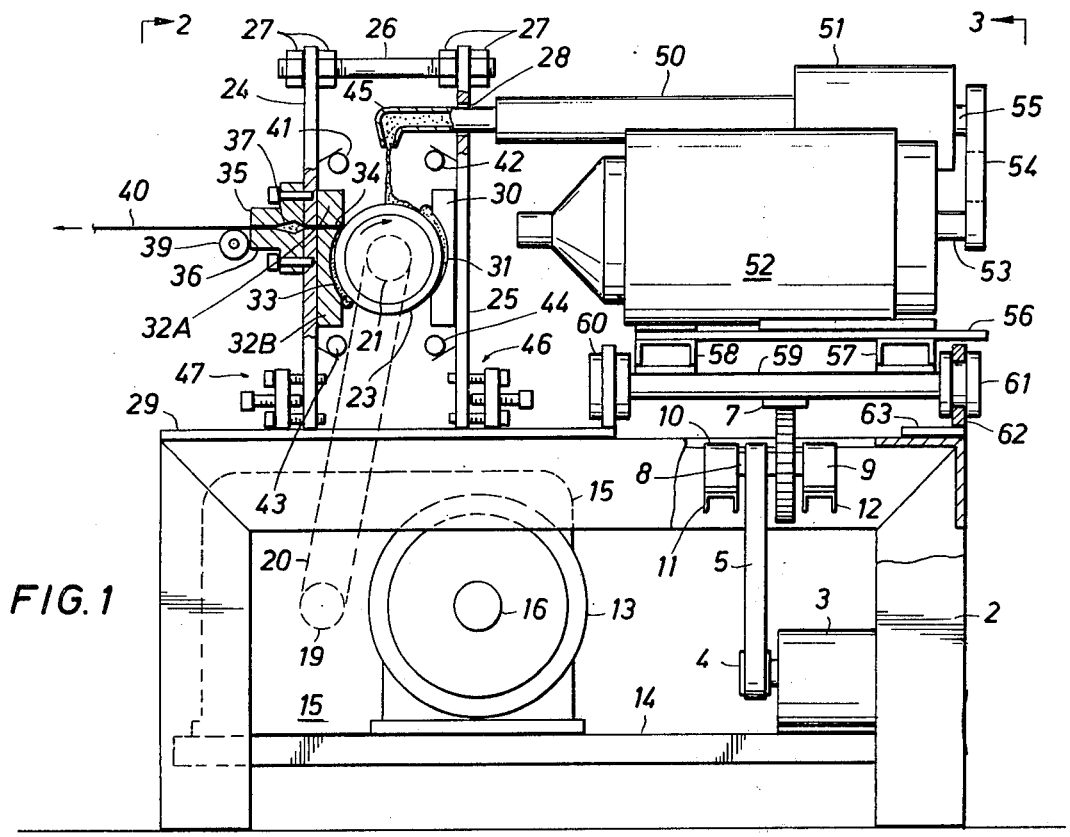
FIG. 1 is a pictorial representation of one embodiment of the present invention, wherein apparatus is provided for producing extruded plastic sheet stock.
Figure 2:
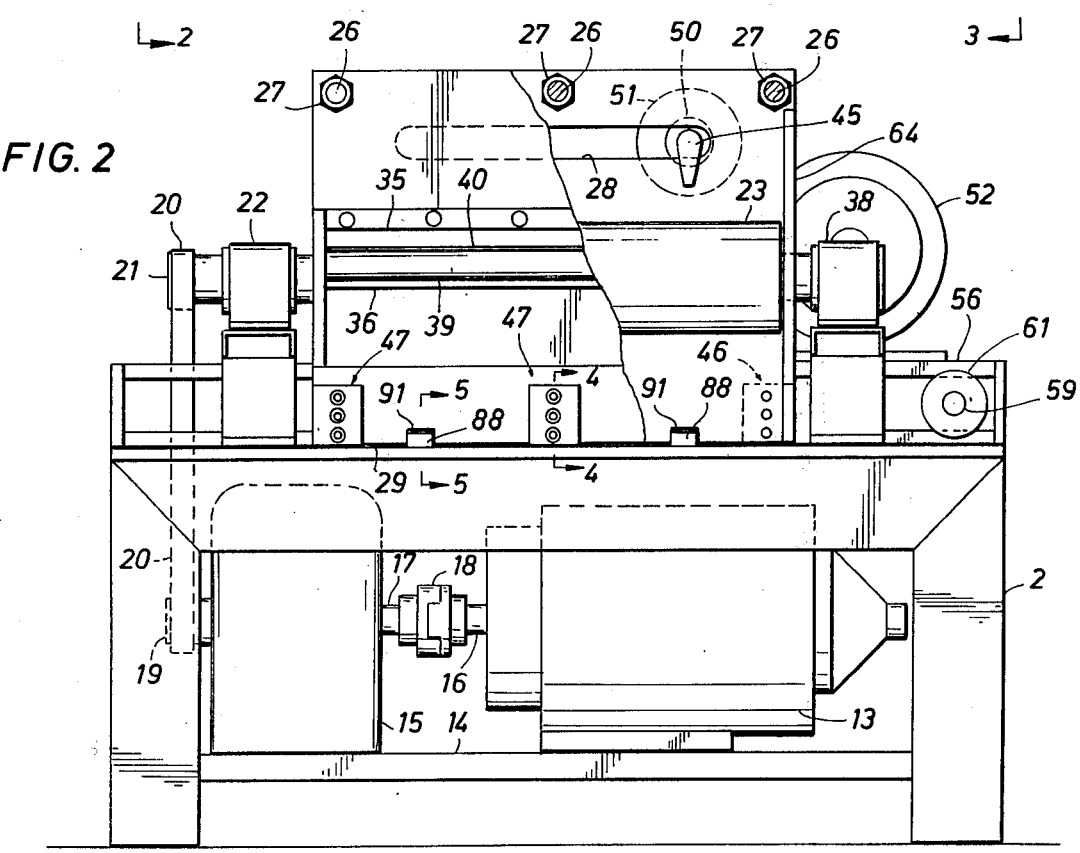
FIG. 2 is a different pictorial representation of the same apparatus depicted in FIG. 1.
Figure 3:
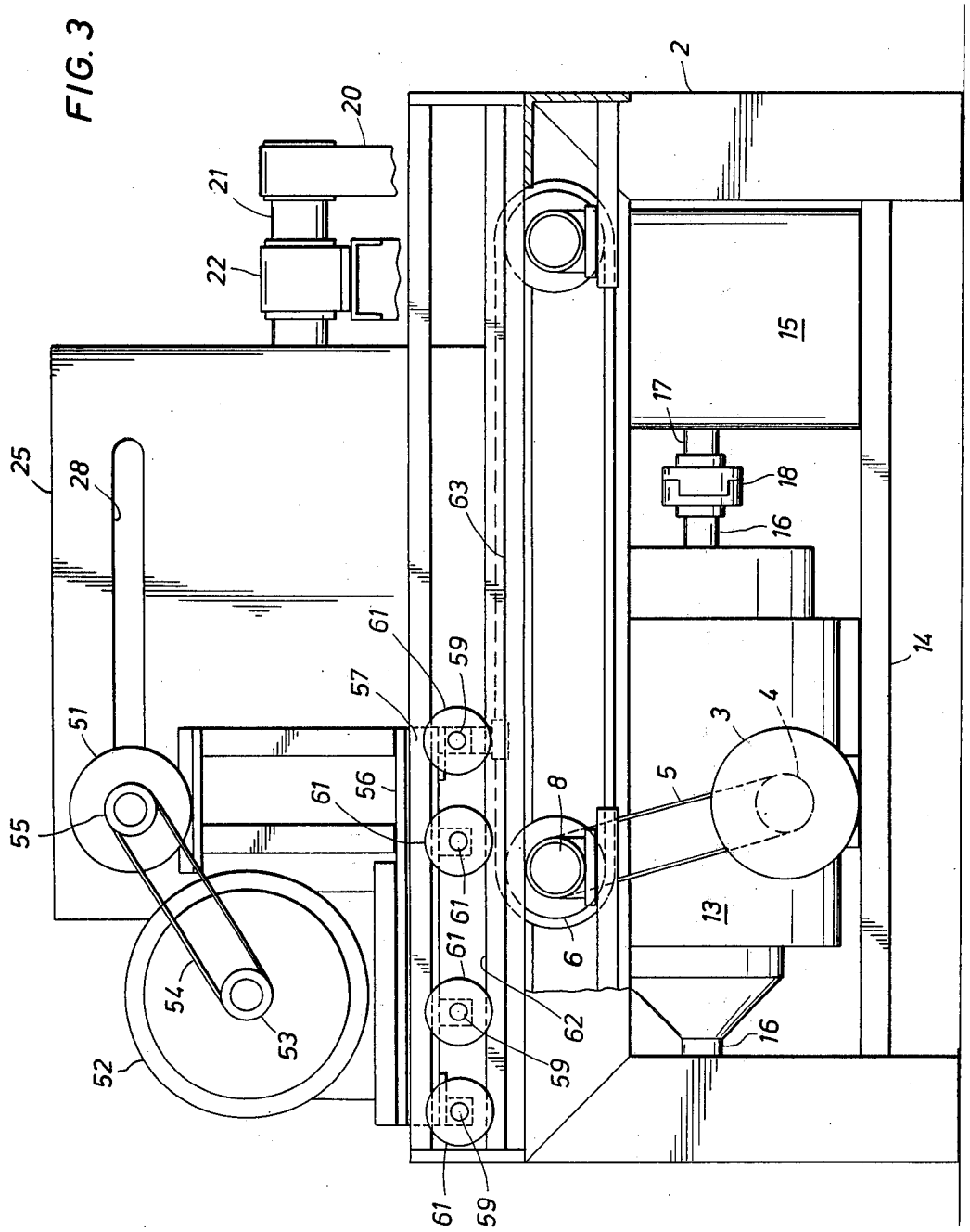
FIG. 3 is another different pictorial representation of the same apparatus depicted in FIGS. 1 and 2.

Referring now to FIGS. 1–3, there may be seen front, side and rear views, respectively, of apparatus designed to produce thermoplastic sheet or film stock according to the concept of the present invention. More particularly, there may be seen a supporting structure or frame 2 having mounted thereon a suitable drive motor 3 for alternately carrying a conventional screw-type expressor 50 or the like in an oscillatory manner back and forth across the upper portion or table 29, and further having a second drive motor 13 mounted on a longitudinal bracket 14 and interconnected to drive a hollow tubular roller 23 of suitable length in a clockwise direction, as hereinbefore explained. More particularly, the drive motor 3 may be connected to rotate a suitable pulley or wheel 4 for driving an endless belt 5 which, in turn, is connected to a shaft 8 having a spur gear 6 concentrically mounted thereon. The shaft 8 is preferably disposed between suitable bearings 9 and 10 which, in turn, are supported by brackets 11 and 12. The spur gear 6 engages a suitable rack 7 which, in turn, is mounted along a plurality of axles 59 having ribbed wheels 60 at one end thereof for bearing on the table 29 and having flanged wheels 61 at their other ends for rotatably engaging a rail 62 or other means which is supported by a longeron 63 or other appropriate portion of the frame 2. As may further be seen in FIG. 1, the axles 59 and wheels 60 and 61 are interconnected with a drive motor 52 having its shaft 53 rotatably interconnected with a shaft 55 by a belt 54. Accordingly, the shaft 55 is peferably coupled through a suitable bearing assembly 51 to revolve the screw (suggested but not depicted) in the expressor 50 for transforming solid pellets of plastic to a flowable state or condition.

The expressor 50 is therefore preferably provided with a suitable discharge means such as a spout or other form of dispensing nozzle 45 and which is suitably positioned above the roller 23. Accordingly, rotation of the spur gear 6 by the oscillatory drive motor 3 will travel the expressor 50 backward and forward across the frame 2, whereby plastic issuing from the nozzle 45 will be distributed substantially evenly along the length of the roller 23.

The purpose of the other drive motor 13 hereinbefore mentioned is to revolve the roller 23 in the desired clockwise direction as depicted in FIG. 1. More particularly, it may be seen that the drive motor 13, which is mounted on the bracket 14, has its shaft 16 connected to the input shaft 17 of a suitable gear reduction assembly 15 by way of a coupling 18 of suitable design. Thus, the output shaft 19 of the gear reduction assembly 15 is interconnected by an endless belt or chain 20 to rotate the shaft 21 supported by bearings 22 and 38, to rotate the roller 23 as hereinbefore described. As hereinbefore stated, it is a feature of the present invention that the roller 23 be mounted so as to swim in the molten plastic enclosed between the blocks 30 and 32B, to maintain equal accumulations of resin and therefore equal pressures in the chambers formed between the roller 23 and the blocks 30 and 32B, and so that opposing and balancing pressures are exerted on the roller 23, and thus bearings 22 and 38 are preferably not "bearings" as such but merely coupling members of the type which will permit such movement of the roller 23.

Referring now to FIG. 1 in particular, it may be seen that the roller 23 is positioned longitudinally and horizontally between a front or die plate 24 and a back-up or back plate 25, and that these plates 24 and 25 are erected in a generally vertical manner on the table portion 29 of the frame 2. More particularly, the plates 25 and 25 are maintained in a suitably spaced-apart manner by appropriate means including the tie rod 26 and nuts 27 and positioning mechanisms 46 and 47 which will hereinafter be described in detail. Thus, the front and back plates 24 and 25 may be slidably shifted on the table 29 by means of positioning mechanisms 46 and 47, whereby the horizontal spacing between the lower ends of the plates 24 and 25 may be varied as desired, and whereby the plates 24 and 25 may also be tilted at a desirable angle relative to the table 29 as will also be hereinafter explained in detail.

Referring now to FIG. 2, it may also be seen that the back plate 25 is provided with a longitudinal aperture or slot 28, and that the dispensing nozzle 45 of the expressor 50 is inserted through this slot 28 in order to position it above the roller 23. Accordingly, this slot 28 permits the portion of the expressor 50 which extends over the roller 23 to travel back and forth in the slot 28 and along the length of the roller 23, as hereinbefore stated.

Referring again to FIG. 1, the back-up or back plate 25 may be seen to be provided with a suitable balancing block 30, which is fixed to the inside surface of the back plate 25 adjacent the roller 23 and which is provided with a circular or concave recess 31. Thus, the roller 23 may be mounted either concentrically or eccentrically in or relative to the recess 31, as will hereinafter be explained. In addition, there may be seen an offsetting or comparable metering block assembly 32 composed of an upper pressure block 32a mounted preferably adjustably on the inside face of the front plate 24 and a lower metering block 32b preferably fixed to the plate 24 immediately below the upper block 32a. The lower block 32b may also be seen to have a concave recess 33 which preferably corresponds in radial magnitude to that of the recess 31 in the balancing block 30, and the upper and lower blocks 32a and 32b are preferably spaced apart a distance such as to provide an exit slot for receiving liquid plastic from the adjacent surface of the roller 23 and forced into this slot by the revolving roller 23. More particularly, however, block 32a and block 32b may be in close contact with each other and are preferably provided with notches or the like which become a plurality of longitudinally spaced-apart ports 34 when the blocks 32a and 32b are positioned together. In addition, these ports are preferably aligned with similar ports in the front plate 24, whereby the liquid plastic will pass to a manifold cavity 37 formed, in turn, by adjacent surfaces of upper and lower die halves 35 and 36. Thus, it will be seen that the adjacent surfaces of the die halves 35 and 36 are such as to also form a relatively large gap at the manifold cavity 37 and to squeeze down to a relatively thin or narrow discharge port adjacent the output of the die halves 35 and 36. Thus, the plastic web 40 extruded from the die halves 35 and 36 may thereafter be conducted away from the apparatus by suitable means such as the takeup roller 39 depicted in FIG. 1.

Referring again to FIG. 1, it should be noted that the liquid plastic may tend to solidify when it contacts the roller 23 and other components during start-up. Accordingly, heating means 41–44 of suitable design may be conveniently included for preheating components such as the roller 23 and blocks 30 and 32 and for maintaining such components at a preselected temperature when desired or necessary.

It should be noted that the liquid plastic being dispensed from the nozzle 45 will frequently have a tendency to spread along the length of the roller 23 as well as about its circumference. Accordingly, end plates such as that suggested by plate 64 in FIG. 2, are preferably mounted at the opposite ends of the roller 23 and between the opposite ends of the front and back plates 24 and 25 to keep the plastic from oozing or dripping off of the ends of the roller 23 and onto the shaft 21.

Referring again to the positioning mechanism 46 in FIGS. 1 and 2, it will be seen that the top and bottom bolts may be adjusted to limit clockwise tilting of plate 25 about the roller 23, and the middle of the three bolts may be adjusted to limit counter-clockwise tilting of plate 24. Tilting of plate 24 is similarly controlled by positioning mechanism 47, of course.

Referring now to FIG. 4, there may be seen a more detailed representation of an alternate positioning mechanism 46A wherein it is indicated that the lower edge of the plate 24A is provided with an L-configuration and is further mounted adjacent a suitable adjustment bracket 70 fixed to the table 29A and having a pair of bolt holes vertically spaced from each other. Accordingly, a bolt 72 may be inserted loosely through the upper bolt hole in the support bracket 70 and through a similar bolt hole in the vertical portion of the plate 24A. The L-shaped lower end of the plate 24 is further provided with a bolt hole, whereby a similar bolt 73 may be inserted therethrough from underneath the table 29A. As may further be seen, the bolt 72 is provided with a wafer-like washer 80 having a rounded surface on one side, with its opposite flat surface in abutting relationship to the head of the bolt 72. A similar wafer-like washer 77 is mounted in collar 82 at the opposite end of the bolt 72, in reverse confrontment to the washer 80, and secured thereto by a nut 74. Similarly, bolt 73 is provided with wafer-like washers 86 and 79, respectively, and a nut 76. The wafer-like washer 80 is slidably positioned in the concave recess of a suitable collar 81 which, in turn, is slidably mounted on the face of the adjustment support bracket 70, and a similar collar 83 is mounted slidably on the opposite side of the back plate 24A.

The bottom washer 86 may be seen to be slidably and shiftably mounted in a collar 85 which, in turn, is slidably abuttable against the under surface of the table 29A, and the upper wafer 79 is similarly recessed in the concave cavity of the collar 83 which, in turn, is also slidably abuttable against the reverse side of the back plate 24A. There is also preferably provided a bolt 71 extending through the lower aperture in the adjustment support bracket 70 and also having a nut 75 at its opposite end for retaining a similar wafer-like washer 78 which, in turn, is slidably disposed in the concave recess of a suitable collar 84 of similar design. In the case of collar 84, it may be seen that this component is disposed in a suitable recess in the side of the bracket 70 opposite the head of the bolt 71.

The purpose of the back plate positioning mechanism 46A is to permit shift of the position as well as the angle of tilt of the back plate 24A. Accordingly, it may be seen that the upper bolt 72 permits the back plate 24A to shift with respect to the mounting bracket 70, and the lower bolt 71 enables the lower end of the back plate 24A to shift relative from the bracket 70. The back plate 24A is elevated above the surface of the table 29A at a suitable height by means of the mechanism depicted in FIG. 5, and therefore the purpose of the third bolt 73 is to secure or retain the plate 25 against the lift of such mechanism. Although not specifically depicted, it should be noted that the front plate positioning mechanism 47, which is generally depicted in FIG. 1, may be the same as that depicted in FIG. 4.

Referring now to FIG. 5, there is preferably provided a suitable mechanism for adjusting the height of the back plate 24A above the table 29A and relative to the surface of the roller 23. More particularly, it may be seen in FIG. 2 that the back plate 25 is preferably provided with a recess 91 at two or more appropriate locations therealong and that the front plate 24 is also preferably provided with a similar pair of spaced-apart recesses 91. Accordingly, these recesses are located so as to accommodate a pair of blocks 88 which, in turn, are suitably fixed to the table 29. Referring to FIG. 5, it will be seen that the blocks 88 are preferably adapted to accommodate and threadably engage a suitable bolt 89 which extends upward through the table 29A and into abutment with the upper edge of the recess 91 in the back plate 24A. Accordingly, rotation of the bolt 89 in the appropriate direction will either elevate or lower the back plate 24A relative to the table 29A. Thus, the front plate 24 is also preferably provided with lifting mechanism such as that depicted in FIG. 5.

Referring now to FIG. 6, there may be seen another form of apparatus embodying the concept of the invention illustrated in FIG. 7 and useful in the equipment depicted in FIGS. 1–3. More particularly, the upper metering block 32A may be provided with a recess 48 which supports a clearance bar 49 immediately adjacent the input side of the extrusion ports 34. Thus, the outer face of the bar 49 is spaced a distance from the face of roller 23 which is less than the closest spacing established between the roller 23 and the concave recess 33 of the lower metering block 32b, whereby liquefied plastic being carried about the face of the roller 23 will find it easier to enter the ports 34 than to continue upward past the clearance bar 49.

Referring now to FIG. 7, there may be seen a modified form of the apparatus depicted in FIGS. 1–3, and in particular a type of calendering or extruding apparatus which, as hereinbefore explained, does not require the services of a separate expressor of conventional design such as that depicted generally in FIG. 1. More particularly, there may be seen an arrangement of front and back plates 102 and 103, which may be held together by a tie rod 111 in the manner hereinbefore described, and having balancing block 109 mounted on the inside surface of the back plate 103 and provided with a concave recess 130 as hereinbefore explained. The front plate 102 is preferably provided with a metering block assembly composed of a lower metering block 105 having a concave recess 99 and an upper metering block 104. As hereinbefore also explained, the upper and lower metering blocks 104 and 105 cooperate to form an exit 119 which may be either a single slot-like aperture, or they may be formed to provide a plurality of ports which, in turn, are aligned with a similar slot or plurality of ports 120 in the front plate 102. Thus, a back pressure adjustment block 133 is preferably slidably mounted on the face of the upper metering block 104 so as to cover the roller 100 from a point beginning with the exit ports 119. As may be further seen, there may also be included upper and lower die halves 112 and 113 of suitable design which are abuttingly arranged to form both a manifold cavity 121 and a narrower slot hereinafter called the die land 122 for suitably forming or extruding the molten plastic into a sheet of the desired width and thickness. In addition, however, it should be noted that while the lower die half 113 is preferably fixed to the front plate 102 by means of a bolt 118, the upper die half 112 is slidably positioned on the front plate 102 and adjacent the lower die half 113, whereby the size or thickness of the manifold cavity 121 and the die land 122 may be adjusted as desired. In addition, the die support 114, which is fastened to the face of the front plate 102 by means of a bolt 115, may be provided with apertures for threadedly engaging a second bolt 117 which extends to abut the upper surface of the upper die half 112, and a non-threaded aperture for accommodating a third bolt 116 which is threadably inserted in the upper die half 112. Thus, the third bolt 116 may be rotated to move the upper die half 112 slidably along the front plate 102 and to and from the lower die half 113, and the second bolt 117 may be rotated to move the outer lip of the upper die half 112 to and from the outer lip of the lower die half 113, whereby the width of the exit end of the die land 122 may be varied as needed. Alternatively, the upper die half 112 can be fixed and the lower die half 113 can be made adjustable, of course, or both can be made selectively positionable relative to the front plate 102.

Referring again to FIG. 7, it may be seen that the hollow roller 100 is centrally mounted on a suitable shaft 101 and is rotatably positioned between the balancing block 109 and the metering blocks 104 and 105 for rotation within the concave recesses 130 and 99. In this respect, it should further be noted that the roller 10 may be eccentrically located relative to these recesses 130 and 99, or it may be concentrically located therein, depending on the characteristics of the plastic sought to be handled. In addition, however, there is preferably provided a feed and transition block 107 which is adjustably secured to the balancing block 109 by suitable means such as the bolt 110, and which is provided with a concave or otherwise curbed surface or face 123 confronting the surface of the roller 100 and preferably having a plurality of irregularly shaped and positioned ribs 124 as depicted in FIG. 8. Also, there may further be provided a feed balancing block 108 which is mounted either fixedly or adjustably under the roller 100 and between the balancing block 109 and the lower metering block 105 by means of bolts 110 or other suitable fastening means. The feed balancing block 108 is preferably provided with a concave upper surface or face 125 which is in confronting relationship to the surface of the roller 100 and which has a curvature radius which is slightly longer than the radius of the roller 100 in one especially suitable embodiment of the invention, depending upon the curvature of the face 123 of the block 107.

Referring again to the apparatus depicted in FIG. 7, it should be noted that a particular feature of this apparatus is that it does not require the use of expressing equipment such as the expressor 50 depicted in FIG. 1. Instead, dry or solid particulate plastic material is deposited directly on the rotating roller 100 through the feed space 97 and is thereafter liquefied and extruded through the ports 119 and 120 to the manifold space 121 and die land 122. Once the apparatus is in production, it tends to achieve such liquefaction by adiabatic means. However, when the apparatus is first energized, it is desirable to provide preliminary heating either to the plastic material being deposited on the roller 100, or to various components of the equipment which directly receive and handle the particulate plastic. Accordingly, heating means (not depicted in FIG. 7) such as that depicted in FIG. 1, are preferably included for preliminary heating or components such as the feed and transition block 107, feed balancing block 108, balancing block 109, roller metering block 105, and especially the upper and lower die halves 112 and 113. Furthermore, heating these components is especially desirable in some instances wherein it is preferable not to operate adiabatically and wherein it is preferable to heat the plastic material primarily by such means.

Referring again to the apparatus depicted in FIG. 7, it should be noted that when the particulate plastic is deposited through the feed space 97 and on the surface of the roller 100, the roller 100 will rotate clockwise to carry such material under the feed and transition block 107 and into the concave cavity 130 of the balancing block 109. In this respect, it should be noted that the feed and transition block 107 is designed to substantially perform the function of the expressor 50 depicted in FIG. 1. Accordingly, it is preferable that the face 123 of the feed and transition block 107 tend to taper in such a manner as to compress the granulated or particulate plastic as it is carried past the feed and transition block 107 and into the concave cavity 103 of the balancing block 109. The purpose of the irregular ribs 124 is to achieve distribution of the particulate material so that the material is uniformly distributed along the length of the roller 100, and more particularly to promote flow between the particulate material so as to achieve homogenizing of the resulting liquid plastic being carried about the roller 100.

As hereinbefore stated, the face 123 tapers in such a manner as to gradually restrict the clearance between the face 123 and the surface of the roller 100. Accordingly, the space between the initial portion of the feed and transition block 107 and the surface of the roller 100 may be characterized as the feed clearance 128, wherein the particulate material is dispersed, diffused and carried therefrom into the narrower transitional clearance 129. The material entering and traversing the transitional clearance 129 will be liquefied and carried into the metering clearance 130 between the roller 100 and the balancing block 109.

The surfaces of the ribs 124 are preferably uniformly spaced from the surface of the roller 100 along their entire length. Accordingly, and as illustrated in FIG. 8, the ribs 124 will be thicker at their upper ends 126 than at their lower or output ends 127 adjacent the entry to the metering clearance 130.

In the case of some plastic materials, it is desirable to maintain the region of the feed clearance 128 at a somewhat lower temperature than the temperature of either the transitional clearance 127 of the metering clearance 130. Accordingly, the feed and transitional block 107 may, if desired, be provided with cooling means such as a plurality of ports 136 and 137 through which water or other liquid coolant may be passed. Likewise, and where desirable, cooling fluids may be passed through the interior of the roller 100.

Referring again to FIG. 7, it will be noted that in the apparatus illustrated therein, the roller 100 is either centrally or concentrically disposed in the concave recesses 130 and 99, respectively. In such an arrangement, the metering clearance 130 is uniform along its length, as is also the case with the metering clearance 131. However, with such an arrangement, the cavity or clearance between the face 125 of the feed balancing block 108 is preferably such as to be relatively narrow at the ends of the block 108 and relatively wide along its central portion. This, of course, corresponds to the curvature provided for the face 123 of the feed and transitional block 107, whereby the feed balancing block 108 functions to maintain equilibrium of the forces across the roller 100 and between the two blocks 107 and 108.

It should be noted that in the case of some types of plastics, heating will develop gas emission which may tend to form bubbles or cavities in the issuing plastic web or stock. Accordingly, the feed balancing block 108 is preferably provided with a plurality of exhaust ports 96 along the length of the roller 100, and which are preferably located at approximately the point where the cavity between the face 125 and the block 108 and the surfaces of the roller begins to widen appreciably.

Referring again to the apparatus depicted in FIG. 7, it should be noted that the rotating roller 10 will tend to carry the plastic in the metering clearance 121 past the exit ports 119, whereas it is the object to insert or force this plastic into these ports 119. Accordingly, it is the function of the back pressure adjustment block 133 to provide a narrow stricture or clearance 132 between the concave surface 98 of the block 133 and the roller 100, whereby plastic entering such clearance 132 will be subjected to a higher pressure than the plastic entering the exit ports 119, and whereby plastic on the surface of the roller 100 will tend to enter the ports 119 rather than the pressure clearance 132 between the face 98 and the surface of the roller 100. In this respect, it should also be noted that the adjustment block 133 is preferably slidably mounted on the outer face of the upper metering block 104 and is secured thereto at the proper location by a bolt 135 which is threadably interconnected with the upper metering block 104, and which permits limited travel of the adjustment block 133 by virtue of a recess 134.

Referring again to FIG. 7, it should be noted that in this equipment the metering clearance 130 is uniform along its length and is the same as the metering clearance 131, and that the metering clearance 131 is also uniform along its entire length. If the roller 100 is eccentrically positioned between the concave recess 99 and the concave recess 95, then the face 123 of the feed and transitional block 107 is preferably curved so as to taper into and match the curvature of the concave recess 95 in the balancing block 109. Similarly, the curvature of the face 125 of the feed balancing block 108 is preferably formed to begin at the termination of the concave surface 95 and continue into and correspond with the beginning of the concave recess 99 in the lower metering block 105. Thus, it may be seen that when the roller 100 is eccentrically mounted between the blocks 109 and 105, such an arrangement will correspond to a screw-type expressor having a uniformly tapering screw design, and when the roller 100 is concentrically mounted between these two components, the arrangement will correspond to a screw-type expressor wherein the clearance between the screw-body (between the threads) and the inside of the barrel is constant along the feed portion, constant but narrower along the metering portion, and tapering along the transition portion intermediate the feed and metering portions.

In this respect, it is well known that good expressing practices require that the pellets of plastic be (1) reduced to molten or otherwise flowable state, (2) that the resulting flow be homogenized to thoroughly intermingle all additives such as coloring, anti-oxidants, etc., and (3) that the liquefied plastic be delivered to the die aperture at the optimum pressure called for by the size, cross-sectional configuration, and length of the particular die being employed. The latter of these requirements is met by the selection of the proper curvature, length and spacing for the clearances 130 and 131 depicted in FIG. 7, and the first requirement is met by selection of the appropriate shape, length and size of the clearance 124. The second requirement, of course, is met by the shape, number and size of the ribs 125 depicted in FIG. 8.

Although the apparatus which is depicted in FIGS. 1–3 contemplates the use of a single expressor of conventional design, it is within the concept of the instant invention to employ a plurality of separate expressors which are fixedly positioned at preselected locations above and along the roller. In addition, the balancing block 30 and back plate 25 may be replaced by components corresponding to the metering blocks 32A and 32B and the front plate 24, whereby two extrusions of sheet stock may be simultaneously obtained with the same roller 23.

It will be apparent that in the apparatus depcited in FIG. 1, and wherein the plastic is expressed by conventional apparatus, the principal function of the roller 23 and blocks 30 and 32 is to deliver molten plastic to the die aperture in even and equal amounts and under a uniform pressure along the length of the die aperture. On the other hand, in the apparatus suggested in FIG. 7, the roller and blocks 104–105 and 107–109 function to perform both to express the plastic into molten form and to deliver it properly to the die aperture 119.

Various other modifications and refinements may be made in the technology described herein without departing from the concept of the present invention. Accordingly, the methods and apparatus described herein and depicted in the accompanying drawings are exemplary only and are not intended as limitations to the scope of the invention.

What is claimed is:

1. A method of producing a thermoplastic sheet material using a single rotating roll extruder rotating in one direction longitudinally between first and second supporting members each having concave confining surfaces, comprising, depositing a thermoplastic resin in a first substantially semi-circular chamber tapering in the direction of roll rotation and formed by the peripheral surface of said extruder roll and said concave surface of said first supporting member, accumulating plasticized resin in said first chamber for creating a first pressure therein against said surface of said roll extruder and said first supporting member, squeezing plasticized resin from said first chamber and into a second substantially semi-circular chamber formed by the peripheral surface of said extruder roll and said concave surface of said second supporting member and tapering in the direction of roll rotation into a slot-like extrusion orifice in said second supporting member, accumulating an equal amount of plasticized resin in said second chamber for establishing and maintaining a second pressure therein against said surfaces of said roll extruder and said second supporting member equal to said first pressure, and squeezing plasticized resin from said second chamber into said extrusion orifice in said second supporting member while maintaining balancing and opposing pressures in said chambers and on said extruder roll and allowing said roll to float between said chambers.

2. The method of claim 1 wherein said resin is in extrudable form when deposited in said first chamber.

3. The method according to claim 1 including passing a portion of the material in said second chamber into a substantially semi-circular back pressure chamber tapering in the direction of roll rotation with the peripheral surface of said extruder roll forming a confining surface of said back pressure chamber.

4. The method according to claim 3 including establishing a pressure on the material in said back pressure chamber for routing material into said extrusion orifice.

5. The method of claim 1 wherein said resin is in dry particulate form when deposited in said first chamber.

6. The method according to claim 5 including passing said resin into a third substantially semi-circular chamber with the peripheral surface of said extruder roll forming a confining surface of said third chamber.

7. The method of according to claim 6 including passing said plasticized resin into a fourth substantially semi-circular chamber tapering in the opposite direction of roll-rotation with the peripheral surface of said extruder roll forming a confining surface of said fourth chamber.

8. The method according to claim 7 wherein said third chamber leads to said first chamber.

9. The method according to claim 8 wherein said fourth chamber leads into said first chamber and said second chamber.

10. The method according to claim 6, including establishing in said third chamber an initial feed region for receiving said dry particulate resin and a subsequent transitional region for plasticizing said resin.

11. The method according to claim 10 including maintaining a temperature differential between the initial feed region and the transitional region of said third chamber.

12. The method according to claim 10 including distributing and homogenizing said dry particulate resin in said third chamber.

13. The method according to claim 10 including passing said plasticized resin from the transitional region of said third chamber into said first chamber.

14. The method according to claim 13 wherein the initial feed region is maintained at a lower temperature than the transitional region of said third chamber.

* * * * *